Sept. 1, 1925.
G. J. BOTHWELL
1,551,864
CONVERTIBLE LUGGAGE CARRIER AND CAMPING BUNK
Filed April 10, 1922      2 Sheets-Sheet 1
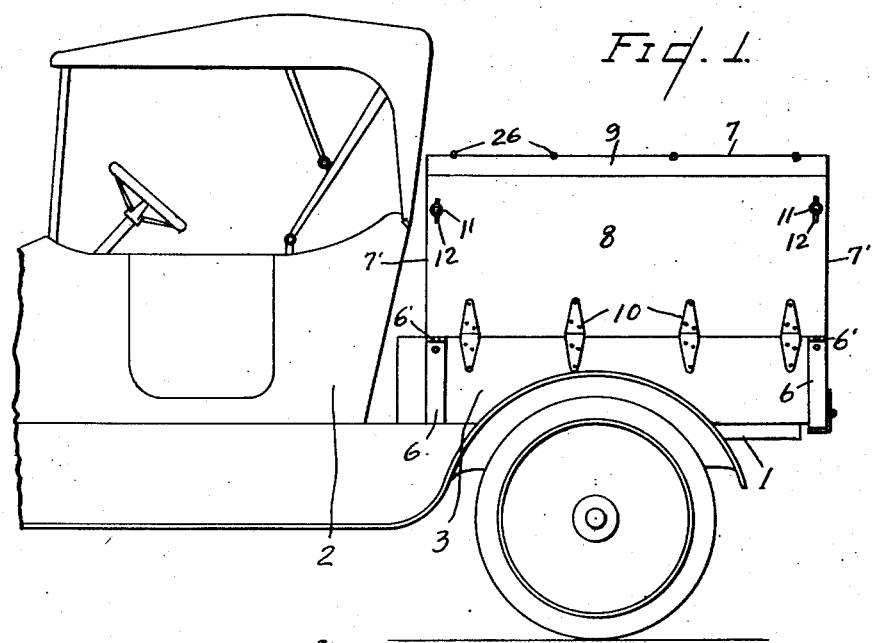
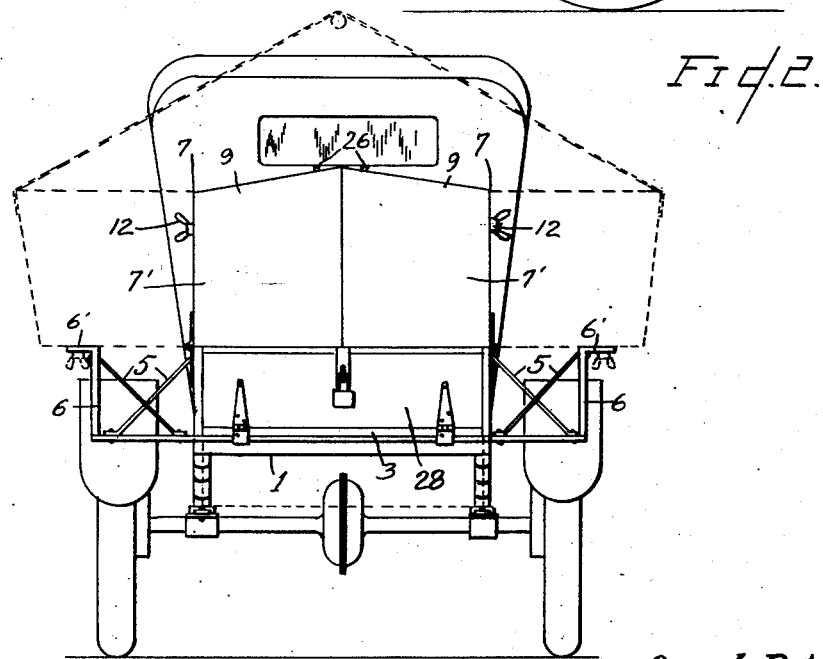
Inventor
Guy J. Bothwell
By
Attorney Sept. 1, 1925. 1,551,864
G. J. BOTHWELL
CONVERTIBLE LUGGAGE CARRIER AND CAMPING BUNK
Filed April 10, 1922   2 Sheets-Sheet 2

Inventor
Guy J. Bothwell
By
Attorney

Patented Sept. 1, 1925.

1,551,864

UNITED STATES PATENT OFFICE.

GUY J. BOTHWELL, OF LONDON, ONTARIO, CANADA.

CONVERTIBLE LUGGAGE CARRIER AND CAMPING BUNK.

Application filed April 10, 1922. Serial No. 551,307.

*To all whom it may concern:*

Be it known that I, GUY J. BOTHWELL, a citizen of the Dominion of Canada, residing at London, in the Province of Ontario, Canada, have invented a new and useful Convertible Luggage Carrier and Camping Bunk, of which the following is a specification.

This invention relates to luggage carriers particularly adapted for use in connection with motor vehicles for touring and camping purposes.

It is the object of the invention to provide for attachment to a tourist's vehicle a foldable housing normally serving for the storage of luggage, such as camping equipment, to transport the same, and which will be readily convertible to form, in an opened or unfolded position, a cot or bunk enclosed by a canvas cover to serve as sleeping quarters when desirous of camping.

In attaining this object the invention contemplates, briefly, the employment of a longitudinally divided box-like housing having the divided sections thereof pivotally mounted at their lower outer edges to the deck or platform of a vehicle box provided with bracket extensions in the plane of said platform, said sections being adapted to unfold from a vertically adjoining relation to horizontally extended positions respectively supported upon said brackets and having interengaging members detachably engageable with said sections to form a cot supporting bunk as well as to support a canvas cover therefor, said cot and cover being subjected to stress by movement of said sections into engagement with said brackets.

A preferred embodiment of the invention is illustrated in the accompanying drawings, in which, Fig. 1 is a side elevation of the rear portion of a motor vehicle showing the present invention thereon in the closed position forming a luggage carrier.

Fig. 2 is a rear elevation of Fig. 1 indicating by dotted lines the opened position of the device forming a bunk and closure therefor.

Figure 3:
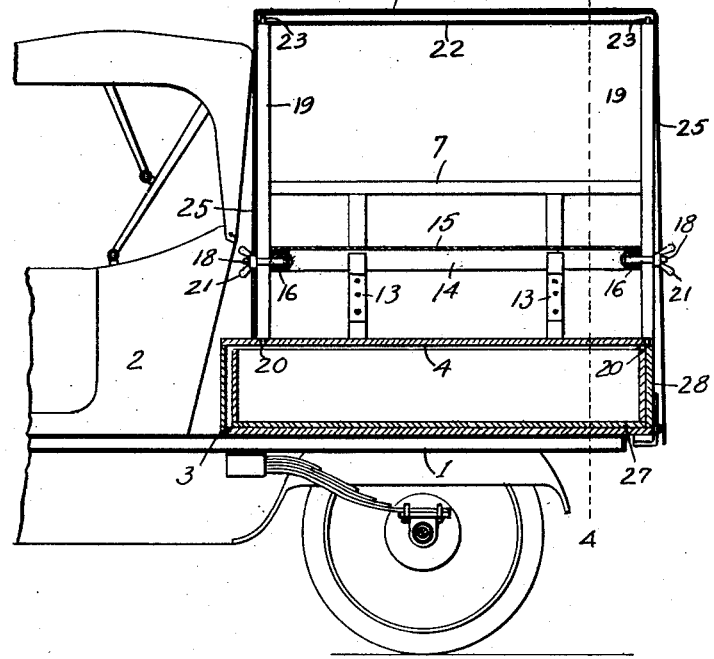
Fig. 3 is a central vertical longitudinal section of the device in the position forming the enclosed bunk.

Referring to the parts shown in the several views of the drawings, 1 represents a motor vehicle frame having the usual body 2 and load box 3 mounted respectively forwardly and rearwardly thereon. Preferably the load box 3 is provided with a deck 4 flush with the upper edges thereof, and secured by brackets 5 to project laterally from the sides at opposite ends of said box are like right-angled bracket arms 6 having their upper terminals formed with forked extremities 6' lying in the plane of said deck.

Mounted upon the deck 4 is a vertically and longitudinally divided housing formed by adjoining sections 7, each comprising rectangular end members 7' respectively connected by a side wall 8 and an oppositely inclined top wall 9, and said sections are each pivotally connected at the lower edge of the side wall 8 to the respective upper edges of the sides of the vehicle box 3 by hinges 10 upon which they are adapted to swing from an adjoining position upon the deck 4 to outwardly extending positions relatively upon the brackets 6 at the respective sides of said box. Bolts 11 are extended through the walls 8 of the sections 7 to engage in the forked extensions 6' of the brackets, and are provided with wing nuts 12 by which said sections may be drawn into engagement with and secured upon said brackets.

Figure 4:
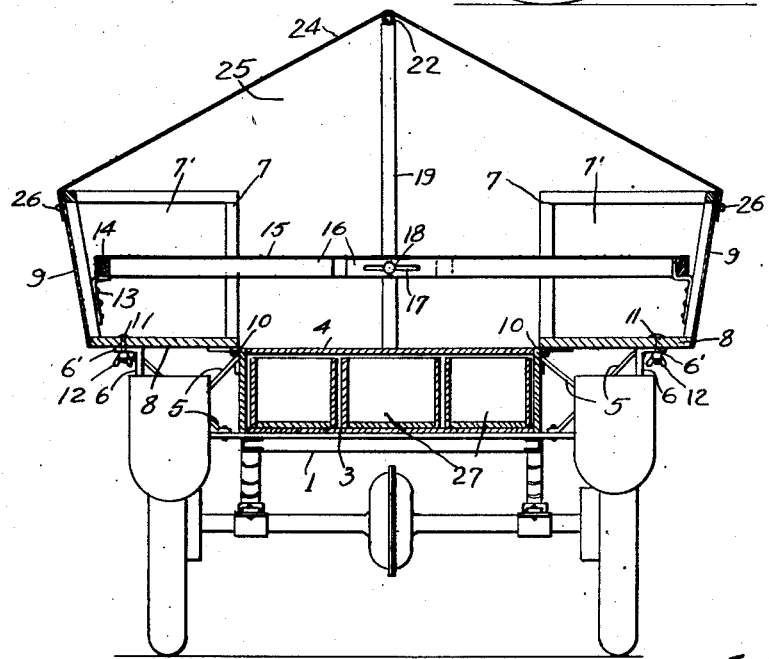
Fig. 4 is a transverse sectional view taken on dashed line 4—4 of Fig. 3.

Secured interiorly to the top wall 9 of each housing section are horizontally alined strap hooks 13 adapted to receive and support the end rails 14 of a canvas covered cot 15, the respective side rails 16 of which are divided and centrally halved together in overlapping relation (see Figs. 3 and 4), the overlapping portions being longitudinally slotted as at 17 for the reception of a bolt 18 upon which the joined sections of said rails may undergo relative longitudinal movement to permit stressing of the canvas cover 15 and also to permit folding of the cot when not in use.

To provide for centrally supporting the cot jointly with a canvas enclosure, uprights or props 19 are anchored at their lower ends by pins 20 in the deck 4 to extend adjacent the respective side rails of the cot, being transversely apertured to receive the threaded ends of the bolts 18 with which wing nuts 21 are engageable to detachably secure said props thereto. At the upper ends said props are connected to the respective ends of a transverse ridge pole 22 by interengaging pins 23, and extending over said ridge pole is a tent-like canvas cover 24 formed with end curtains 25 and having the side walls of said cover secured by button fastenings 26 to the upper edges of the top walls 9 of the respective housing sections.

In setting up the described structure, preferably the cot and canvas cover are engaged with the housing sections before the latter are swung to their fully extended positions, so that in event the canvas members are in a wrinkled and contracted condition as a result of being stored, the further outward separating movement of said sections as they are finally engaged with their bracket supports will set up a stretching stress upon said members, thus insuring a taut and secure mounting thereof.

As a convenient means for affording storage for such parts of the structure as may not be accommodated within the housing and for such other camping utensils as may be desired to transport, slidable drawers 27 may be provided within the vehicle box 3, and accessibly enclosed by the tail door 28 of said box.

It will appear from the foregoing that by the described construction and arrangement of parts means is afforded for compactly storing camping equipment for transportation upon a tourist's vehicle, and which will be conveniently accessible and readily convertible to form an enclosed sleeping bunk for camping use.

What I claim is:

1. In a device of the character described, the combination with two spaced frames, of a cot extending between and detachably mounted upon said frames, a fabric cover member secured at its ends to said frames, an upright between said frames supporting said cover member at an elevation above said cot, and means supporting said cot, intermediate its ends upon said upright.

2. In a device of the character described, the combination with two spaced frames, of a collapsible cot frame extending between and detachably mounted upon said spaced frames, said cot frame comprising parts pivotally joined intermediate its ends, a fabric cover member secured at its ends to said spaced frames, an upright between said ends supporting said cover member at an elevation above said cot frame, and a common means for pivotally connecting said parts of the cot frame and for supporting the cot intermediate its length upon said upright.

3. In a device of the character described, the combination with two spaced frames, of a cot extending between and detachably mounted upon said frames, a fabric cover member secured at its ends to said spaced frames, and a member arranged between said frames forming a common support for the mid-length portion of the cot and for said cover member.

4. In a device of the character described, the combination with a cot and a fabric cover member, of a pair of spaced supports for the cot extremities between which supports the fabric cover member is extended, a pair of uprights arranged between said spaced supports, one at each side of said cot, and elevating said cover member above the cot, and means supporting the cot intermediate its length upon said uprights.

In testimony whereof I sign this specification.

GUY J. BOTHWELL.